US006907787B2

(12) United States Patent
Cook et al.

(10) Patent No.: US 6,907,787 B2
(45) Date of Patent: Jun. 21, 2005

(54) SURFACE ACOUSTIC WAVE PRESSURE SENSOR WITH MICROSTRUCTURE SENSING ELEMENTS

(75) Inventors: James D. Cook, Freeport, IL (US);
Brian J. Marsh, Freeport, IL (US);
Brian D. Speldrich, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/427,104

(22) Filed: Apr. 30, 2003

(65) Prior Publication Data

US 2004/0216526 A1 Nov. 4, 2004

(51) Int. Cl.[7] .............................................. G01L 7/00
(52) U.S. Cl. ......................................... 73/700; 73/702
(58) Field of Search .................................. 73/700, 702

(56) References Cited

U.S. PATENT DOCUMENTS

| | | | |
|---|---|---|---|
| 3,978,731 A | 9/1976 | Reeder et al. | 73/407 PR |
| 4,454,440 A | 6/1984 | Cullen | 310/313 R |
| 5,471,723 A | 12/1995 | Luder et al. | 29/25.41 |
| 5,659,195 A | 8/1997 | Kaiser et al. | 257/415 |
| 6,003,378 A | 12/1999 | Scherr et al. | 73/703 |
| 6,374,678 B1 | 4/2002 | Masuda | 73/706 |
| 6,462,698 B2 | 10/2002 | Campbell et al. | 342/51 |
| 6,541,893 B2 | 4/2003 | Zhu et al. | 310/313 |
| 6,550,337 B1 | 4/2003 | Wagner et al. | 73/715 |
| 6,571,638 B2 * | 6/2003 | Hines et al. | 73/702 |
| 2002/0078757 A1 | 6/2002 | Hines et al. | 73/727 |

FOREIGN PATENT DOCUMENTS

WO   WO 02/31461 A1   10/2001   ............. G01L/9/00

OTHER PUBLICATIONS

Y. Vlassov, et al., "Precision SAW Pressure Sensors", 1993 IEEE International Frequency Control Symposium, Jul. 1993, pp. 665–669.

PCT Notification of Transmittal of The International Search Report and the Written Opinion of the International Searching Authority, or the Declaration, Mailing Date: Sep. 14, 2004.

* cited by examiner

Primary Examiner—Edward Lefkowitz
Assistant Examiner—Andre Allen
(74) Attorney, Agent, or Firm—Kris T. Fredrick; Kermit D. Lopez; Luis M. Ortiz

(57) ABSTRACT

A pressure and temperature sensor system, the system comprising one or more microstructure temperature-sensing elements formed on a substrate within a hermetically sealed area thereof, wherein such microstructure temperature-sensing elements comprise SAW temperature-sensing elements. Additionally, one or more microstructure pressure-sensing elements can be located above a sensor diaphragm on the substrate, such that the microstructure pressure-sensing element is formed from a SAW pressure-sensing element. One or more contacts can also be provided, which assist in maintaining the hermetically sealed area and which protrude through the substrate for support and electrical interconnection of the pressure and temperature sensor system.

20 Claims, 4 Drawing Sheets

(Section A-A)

SURFACE ACOUSTIC WAVE PRESSURE SENSOR WITH MICROSTRUCTURE SENSING ELEMENTS

TECHNICAL FIELD

The present invention is generally related to sensing methods and systems. The present invention is related to pressure sensors utilized in automotive, heavy-duty vehicles, industrial and similar commercial markets. The present invention is also related to micro electro mechanical systems (MEMS) and surface acoustic wave (SAW) devices thereof. The present invention is additionally related, but not limited to tire pressure and temperature measurement applications.

BACKGROUND OF THE INVENTION

Various sensor technologies are known in the pressure and temperature sensing arts. In particular, various techniques have been proposed for sensing the pressure and temperature in tires and for delivering this information to the operator at a central location on the vehicle so that the operator knows that a tire is at low or high air pressure or temperature.

Such pressure sensors generally communicate with the vehicle so that the sensed pressure is displayed to the operator when the vehicle is moving, (i.e., the wheel rotating relative to the body of the vehicle). Such devices are generally relatively complex and expensive or alternatively are not particularly robust. Thus, a need clearly exists for alternatives, which are less expensive while providing more efficient sensing activities.

Conventional types of pressure and temperature sensor systems are generally categorized according to measurements, which utilize indirect or direct sensing techniques. Indirect sensors can predict or calculate pressure or temperature based upon the measurement tire dimensions or vehicle height. Direct sensing systems measure the actual pressure and temperature inside the tire by placing a sensor inside the tire. The invention described herein generally utilizes a direct measurement approach.

Some tire pressure sensor systems incorporate a sensor that is fixed to the body so no rotating electrical contact between the rotating wheel and the chassis is required. In this type of tire pressure sensing system, a sensor rod is deflected by contact with the tire sidewall when the sidewall of the tire is deformed as occurs when the tire pressure is low. This system provides an indication of low tire pressure but is not robust. For example, mud or other debris on the wheels may provide faulty readings. Furthermore, this type of system can provide an indication only when the tire pressure is reduced significantly as is necessary for significant tire bulge to occur. Clearly such a system simply cannot provide a reading of actual tire pressure.

In another form of a fixed sensor, the height of the vehicle can be detected and when the height is reduced, it is deemed tire pressure is low. However, if the tire in a rut or is parked on uneven ground, a faulty low-pressure reading is likely to be generated.

More complicated systems are capable of monitoring tire pressure. For example, some pressure sensor systems utilize a rotating encoder formed by a multipolar ring of magnetic segments of different polarity that are distributed circumferentially in a regular and alternating manner. A transmitter coil coaxial with the ring and a fixed pickup (e.g., an induction coil system) can be energized by alternating electrical current flowing through the transmitter coil to generate a magnetic field superimposed on the magnetic field created by the multipolar ring generates a signal picked up and delivers a signal relating the rotating characteristic of the wheel and thus, the state of the tire.

Some tire pressure systems also utilize a wheel system wherein each sensor on each wheel is provided with a radio transmitter that transmit the information on tire pressure, etc. from the wheel to a radio receiver on the body of the vehicle and this transmitted signal is decoded to provide information on tire pressure etc. and makes it available to the operator. Conventional wireless systems, however, are not durable and are expensive to design and produce, usually require batteries to operate The present inventors have concluded that a need exists for an improved compact tire pressure design that includes wireless sensing capabilities, while implemented via a practical and low cost design solution, which is not available in present tire pressure sensing systems and devices. In particular, the present inventors believe that the use of a SAW sensing element can provide a practical and low cost solution to the problems inherent with conventional systems. The present inventors believe that a solution to the aforementioned problems involves the combination of microstructure sensing elements, and SAW technology. This design is disclosed in greater detail herein.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide an improved sensor system and method.

It is another aspect of the present invention to provide for a sensor system and method for use in tire pressure and temperature sensing applications.

It is a further aspect of the present invention to provide an improved SAW pressure and temperature sensor system.

It is also an aspect of the present invention to provide surface or bulk micromachined sensing elements formed within a hermetically sealed chip sensor package.

It is an additional aspect of the present invention to provide a SAW pressure and temperature sensor system, which can be utilized as a component of a wireless tire pressure monitoring system (TPMS).

The aforementioned aspects of the invention and other objectives and advantages can now be achieved as described herein. A temperature sensor system that includes one or more microstructure temperature-sensing elements formed on a substrate within a hermetically sealed area thereof, wherein such microstructure temperature-sensing elements comprise SAW temperature-sensing elements. Both the microstructure temperature-sensing element and the SAW temperature-sensing elements can be referred to as an Interdigital Transducer (IDT).

Additionally, one or more microstructure pressure-sensing elements can be located above a sensor diaphragm on the substrate, such that the microstructure pressure-sensing element is formed from a SAW pressure-sensing element (also referred to as an IDT). One or more contacts can also be provided, which assist in maintaining the hermetically sealed area and which protrude through the substrate for support and electrical interconnection of the pressure sensor system.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate at least one embodiment of the present invention and are not intended to limit the scope of the invention.

Figure 1:
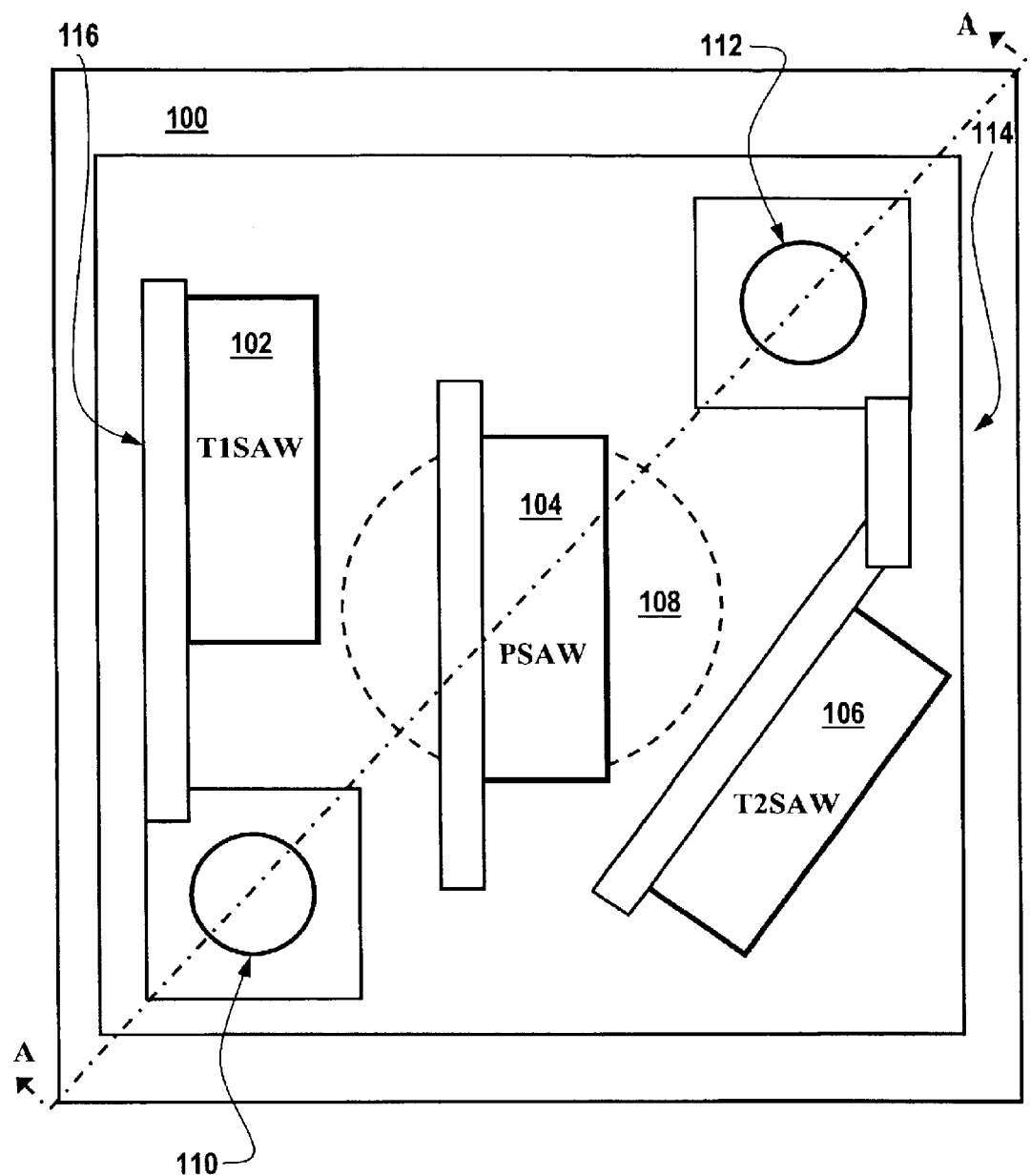
FIG. 1 illustrates a diagram depicting a SAW pressure chip, which can be implemented in accordance with a preferred embodiment of the present invention.
Figure 4:
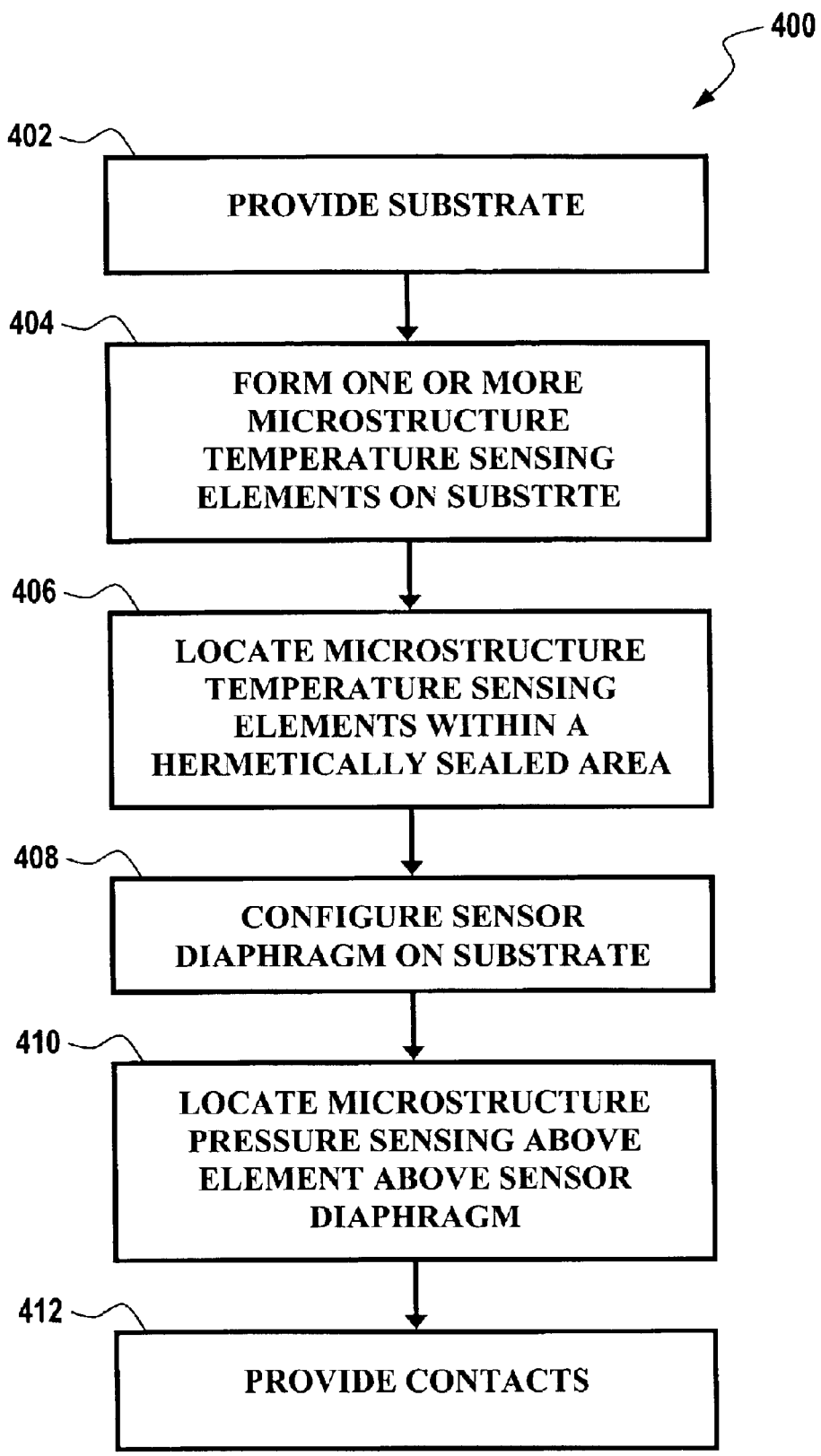
FIG. 4 illustrates a high-level flow chart of operations for forming a SAW pressure chip, in accordance with an alternative embodiment of the present invention.

FIG. 1 illustrates a diagram depicting a SAW pressure chip 100, which can be implemented in accordance with a preferred embodiment of the present invention. Chip 100 can be implemented as a system that generally includes two temperature-sensing elements 102 and 106, and a pressure-sensing element 104. Although only two temperature-sensing elements 102 and 106 are illustrated in FIG. 4, it can be appreciated by those skilled in the art that SAW pressure chip 100 can be configured to include additional temperature-sensing elements. For example, a third or a fourth temperature-sensing element can be added to chip 100, depending upon particular implementations thereof.

Chip 100 also includes a hermetically sealed area 114, which surrounds temperatures sensing elements 102 and 106, and pressure-sensing element 104. Additionally, hermetically sealed area 114 surrounds contacts 110 and 112. Chip 100 also has metal interconnects 116, which connect the sensing elements electrically. Although only two contacts 110 and 112 are shown in FIG. 1, it can be appreciated by those skilled in the art that if necessary, additional contacts may be utilized to secure chip 100 for sensing activities.

Pressure-sensing element 104 is generally located above a sensor diaphragm 108. Temperature-sensing elements 102 and 106 can be implemented as SAW temperature-sensing elements (TSAW), while pressure-sensing element 104 can be implemented as a SAW pressure-sensing element (PSAW). Temperature-sensing elements 102 and 106 are generally located away from the sensor diaphragm 108. Contacts 110 and 112 can be implemented as through the wafer (TTW) contacts. The sensing elements 102, 106 and 104 can be formed via bulk or surface machining of quartz, silicon or other crystalline materials. The sensor diaphragm 108 can be formed using bulk micromachining processes similar to those common in the MEMS industry.

Figure 2:
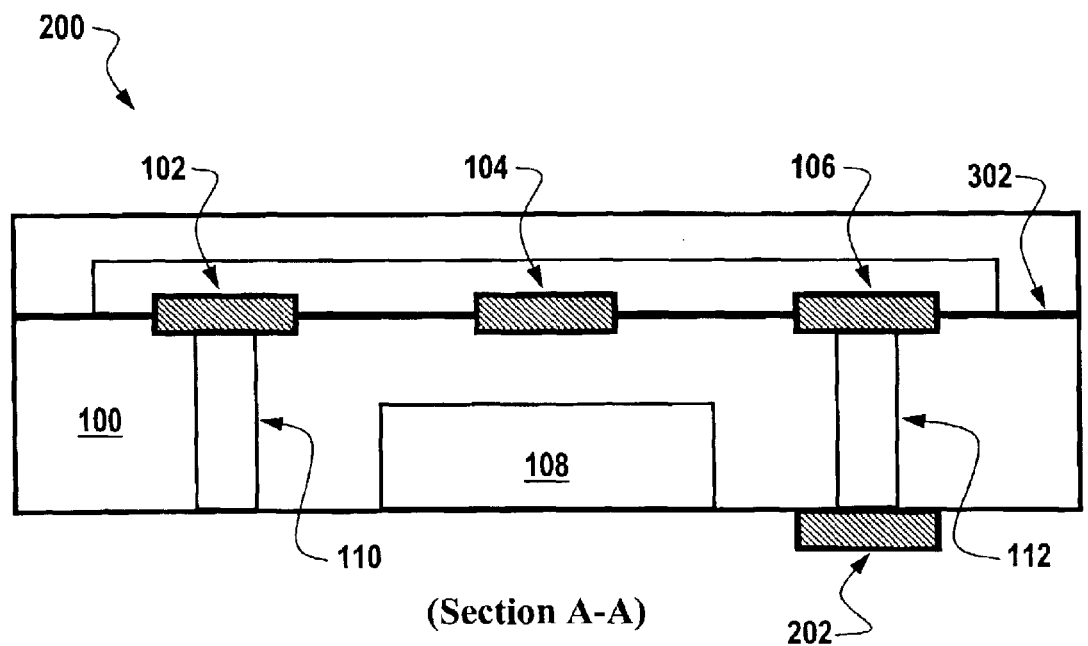
FIG. 2 illustrates a diagram indicating reference pressure on the topside of the SAW chip depicted in FIG. 1, in accordance with a preferred embodiment of the present invention.
Figure 3:
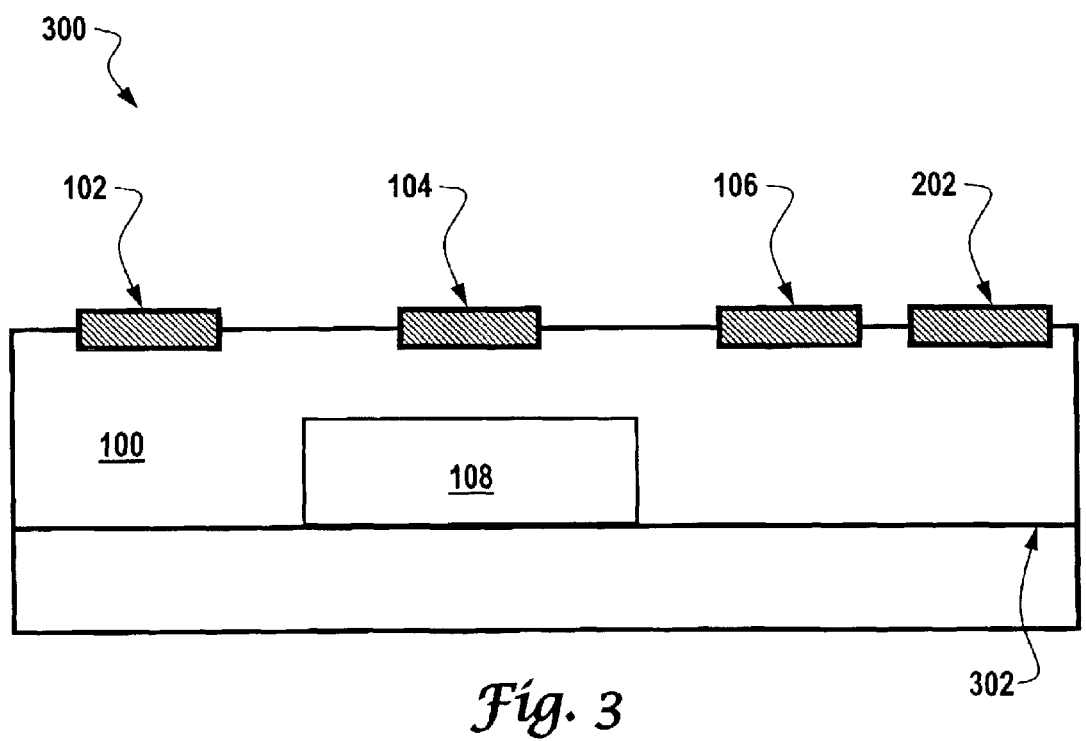
FIG. 3 illustrates a diagram depicting reference pressure on the bottom side of the SAW chip depicted in FIG. 1, in accordance with an alternative preferred embodiment of the present invention.

FIG. 2 illustrates a side view 200 indicating reference pressure on the topside of the SAW chip 100 depicted in FIG. 1, in accordance with a preferred embodiment of the present invention. FIG. 3, on the other hand, illustrates a bottom side view 300 depicting reference pressure on the bottom side of the SAW chip 100 depicted in FIG. 1, in accordance with a preferred embodiment of the present invention. Note that in FIGS. 1 to 3, like or analogous parts are indicated by identical reference numerals. FIGS. 2 and 3 additionally illustrates a wafer-to-wafer bond 302 and external connection pads 202. FIGS. 1 and 2 additionally illustrate section A—A views of SAW chip 100.

FIGS. 1 to 3 thus generally illustrate a pressure sensor system that can include one or more microstructure temperature-sensing elements 102 and 106 formed on a substrate within a hermetically sealed area 114 thereof, wherein such microstructure temperature-sensing elements 102 and 106 comprise SAW temperature-sensing elements. Such SAW temperature-sensing elements are also referred to as an IDT. Note that in general, coupling between surface waves and electrical signals can be achieved by IDTs.

One simple form of an IDT can include many parallel fingers alternately connected to opposite electrodes to which the signal is applied. The wavelength of the generated elastic wave is equal to the transducer periodicity p, defined as the center distance between two consecutive fingers of one comb of the IDT. It can be appreciated by those skilled in the art that various other types of IDT structures can be utilized in accordance with a preferred or alternative embodiment of the present invention.

Additionally, a microstructure pressure-sensing element 104 can be located above a sensor diaphragm 108 on the substrate. The microstructure pressure-sensing element 104 can be formed from a SAW pressure-sensing element. Contacts 110 and 112 can also be provided, which assist in maintaining the hermetically sealed area 114 and which protrude through the substrate for support of the pressure sensor system.

FIG. 4 illustrates a high-level flow chart 400 of operations for forming a SAW pressure chip, in accordance with an alternative embodiment of the present invention. As illustrated a block 402, a substrate can be provided. Thereafter, as indicated at block 404, one or more microstructure temperature-sensing elements can be formed on the substrate. Next, as depicted at block 406, the microstructure temperature-sensing elements can be formed within a hermetically sealed area on the substrate.

An example of microstructure temperature-sensing elements, which can be formed according to the methodology illustrated in FIG. 4 include, for example, temperature-sensing elements 102 and 106 depicted in FIG. 1. Note that the operations described at blocks 404, 406 and 408 can be performed together as one operation rather than separate process steps, depending upon a desired implementation.

As depicted at block 408, a sensor diaphragm, such as sensor diaphragm 108 can be formed on the substrate. Next, as illustrated at block 410, one or more microstructure sensing elements can be located above the sensor diaphragm on the substrate. Finally, as depicted at block 412, one or more contacts can be provided which can assist in maintaining the hermetically sealed area and which protrude through the substrate for support of the pressure sensor system formed thereof.

Examples of such contacts, which can be utilized according to the methodology of FIG. 4 are contacts 110 and 112 of FIG. 1. Although block 412 only describes the use of two contacts, it can be appreciated by those skilled in the art that additional contacts can be utilized in accordance with the operation step depicted at block 412. For example, three or four contacts can be provided.

Based on the foregoing, it can be appreciated that the present invention generally discloses a temperature sensor system that includes one or more microstructure temperature-sensing elements (usually referred to as Interdigital Transducers (IDT)) formed on a substrate within a hermetically sealed area thereof, wherein such microstructure temperature-sensing elements comprise SAW temperature-sensing elements (also referred to as an IDT).

Additionally, one or more microstructure pressure-sensing elements can be located above a sensor diaphragm on the substrate, such that the microstructure pressure-sensing element is formed from a SAW pressure-sensing element (i.e., also referred to as an IDT). One or more contacts can also be provided, which assist in maintaining the hermetically sealed area and which protrude through the substrate for support and electrical interconnection of the pressure sensor system.

Figure 5:
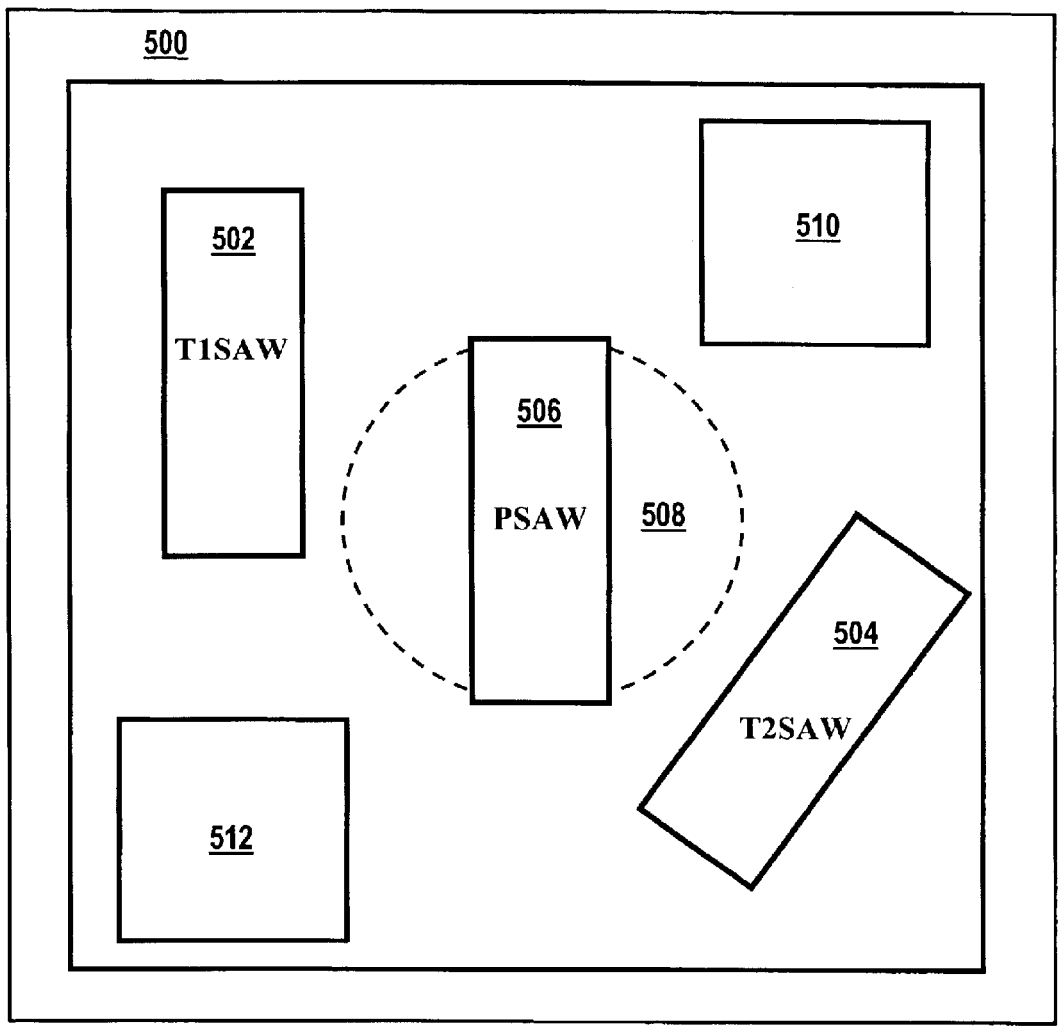
FIG. 5 illustrates a diagram depicting a non-hermetically sealed SAW pressure sensor chip, which can be implemented in accordance with an alternative embodiment of the present invention.

FIG. 5 illustrates a diagram depicting a non-hermetically sealed SAW pressure sensor chip 500, which can be implemented in accordance with an alternative embodiment of the present invention. Chip 500 can be implemented utilizing an etched quartz sensor diaphragm 508. A PSAW 506 can be located over the diaphragm 508 (i.e., diaphragm area). Two or more TSAWs 502 and 504 can be located away from the diaphragm area. Additionally, electrical connections pads 510 and 512 can be located opposite one another and away from the diaphragm area.

Figure 6:
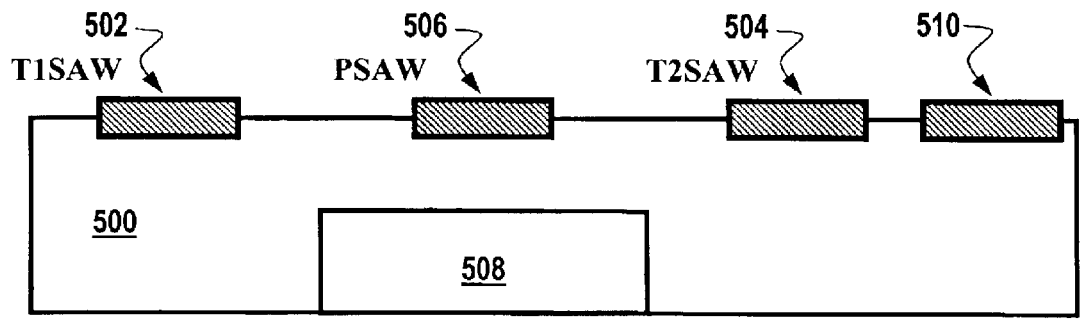
FIG. 6 illustrates a side view of the SAW pressure sensor chip depicted in FIG. 5, in accordance with an alternative embodiment of the present invention.

Note that in FIGS. 5 and 6, like or analogous parts are indicated by identical reference numerals. Thus, FIG. 6 illustrates a side view of the SAW pressure sensor chip depicted in FIG. 5, in accordance with an alternative embodiment of the present invention. FIGS. 5 and 6 together illustrate a non-hermetically sealed SAW sensor chip 500.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

What is claimed is:

1. A pressure sensor system, said system comprising:
   at least one microstructure temperature-sensing element formed on a substrate, within a hermetically sealed area thereof;
   at least one microstructure pressure-sensing element located above a sensor diaphragm on said substrate; and
   at least two contacts which protrude through said substrate for support of said pressure sensor system, wherein said at least two contacts assist in maintaining said hermetically sealed area of said pressure sensor system.

2. The system of claim 1 wherein said at least two contacts comprise through-the-wafer (TTW) contacts.

3. The system of claim 1 wherein said at least one microstructure temperature-sensing element comprises at least one SAW temperature-sensing element and wherein said at least two contacts are surrounded by said hermetically sealed area.

4. The system of claim 1 wherein said at least one microstructure pressure-sensing element comprises at least one saw pressure-sensing element and wherein said at least two contacts are surrounded by said hermetically sealed area.

5. The system of claim 1 wherein said at least one microstructure temperature-sensing element and at least one microstructure pressure-sensing element comprise surface micromachined sensing elements.

6. The system of claim 1 wherein said at least one microstructure temperature-sensing element and at least one microstructure pressure-sensing element comprise bulk micromachined sensing elements.

7. The system of claim 5 wherein said surface micromachined sensing elements are formed from a crystalline material.

8. The system of claim 5 wherein said surface micromachined sensing elements are formed from quartz.

9. The system of claim 6 wherein said surface micromachined sensing elements are formed from silicon.

10. The system of claim 6 wherein said bulk micromachined sensing elements are formed from a crystalline material.

11. The system of claim 6 wherein said bulk micromachined sensing elements are formed from quartz.

12. The system of claim 6 wherein said bulk micromachined sensing elements are formed from silicon.

13. A pressure sensor system, said system comprising:
    a non-hermetically sealed sensor chip comprising a substrate;
    two microstructure temperature-sensing elements formed on said substrate, wherein said two microstructure temperature-sensing elements comprise SAW temperature-sensing elements composed of a interdigital transducer (IDT) having a plurality of parallel fingers alternately connected to opposite electrodes to which at least one signal can be applied;
    one microstructure pressure-sensing element located above a sensor diaphragm within a diaphragm area on said substrate, wherein said microstructure pressure-sensing element comprises a SAW pressure-sensing element composed of an interdigital transducer (IDT) having a plurality of parallel fingers alternately connected to opposite electrodes to which at least one signal can be applied; and
    two electrical connection pads located opposite one another upon said substrate and away from said diaphragm area, wherein said two electrical connection pads, said two microstructure temperature-sensing elements, said one microstructure pressure-sensing element and said two electrical connection pads are disposed within said non-hermetically sealed sensor chip.

14. A pressure sensor method, said method comprising:

forming at least one microstructure temperature-sensing element on a substrate within a hermetically sealed area thereof;

locating at least one microstructure pressure-sensing element above a sensor diaphragm on said substrate; and providing at least two contacts, which protrude through said substrate for support of said pressure sensor system wherein said at least two contacts assist in maintaining said hermetically sealed area of said pressure sensor system.

15. The method of claim 14 further comprising the step of configuring said at least two contacts as through-the-wafer (TTW) contacts.

16. The method of claim 14 further comprising the step of:

forming said at least one microstructure temperature-sensing element to comprise at least one SAW temperature-sensing element; and surrounding said at least two contacts by said hermetically sealed area.

17. The method of claim 14 further comprising the step of:

forming said at least one microstructure pressure-sensing element to comprise at least one SAW pressure-sensing element; and surrounding said at least two contacts by said hermetically sealed area.

18. The method of claim 14 further comprising the step of:

forming said at least one microstructure temperature-sensing element and at least one microstructure pressure-sensing element to comprise surface micromachined sensing elements.

19. The method of claim 18 further comprising the step of:

forming said surface micromachined sensing elements from a crystalline material, wherein said at least two contacts comprise through-the-wafer (TTW) contacts.

20. The method of claim 18 further comprising the step of:

forming said surface micromachined sensing elements from quartz, wherein said at least two contacts comprise through-the-wafer (TTW) contacts.

* * * * *